July 15, 1969
E. R. HUBER
3,456,138
ROTARY STEP-BY-STEP MOTOR WITH DAMPER
AND PLURAL MAGNET ROTOR
Filed Oct. 7, 1966
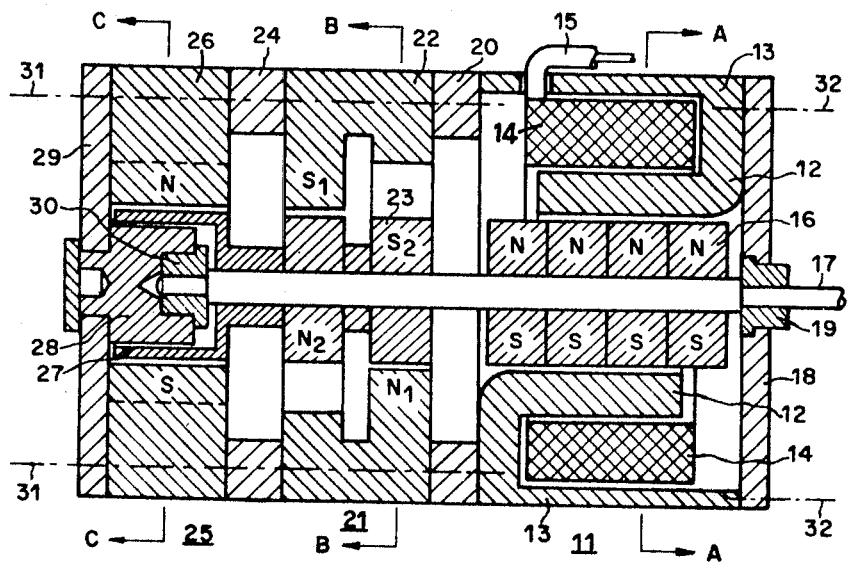
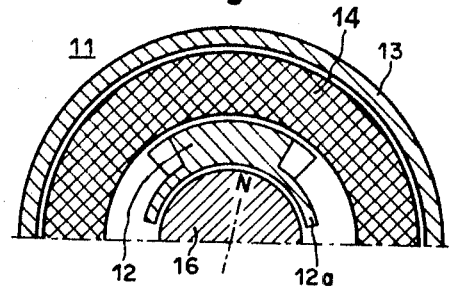
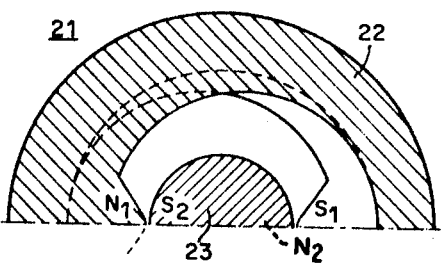
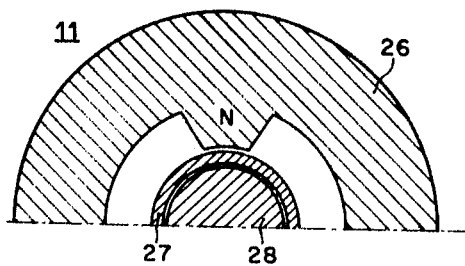
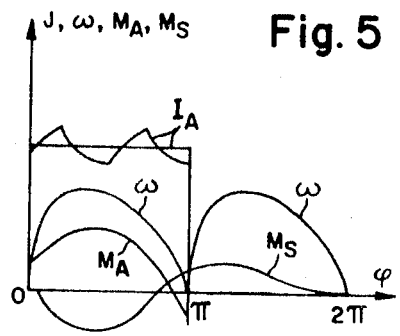
*INVENTOR.*
ERNST R. HUBER
BY
Morgan, Finnegan, Durham & Pine
ATTORNEYS.

United States Patent Office 3,456,138
Patented July 15, 1969

3,456,138
ROTARY STEP-BY-STEP MOTOR WITH DAMPER AND PLURAL MAGNET ROTOR
Ernst Rudolf Huber, Settinger, Switzerland, assignor to Landis & Gyr, A.G., Zug, Switzerland, a body corporate
Filed Oct. 7, 1966, Ser. No. 585,101
Claims priority, application Switzerland, Oct. 12, 1965, 14,050
Int. Cl. H02k 37/00
U.S. Cl. 310—49          15 Claims

ABSTRACT OF THE DISCLOSURE

A rotary step-by-step motor including a plural permanent magnet rotor, one rotating permanent magnet cooperating with an electromagnetic coil for rotation through an angle from $0-\pi$ degrees, and the other rotating permanent magnet structure cooperating with a stationary peramnent magnet to store energy through an angle from $10-\pi$ degrees and to release energy through an angle from $\pi-2\pi$ degrees. A damping structure is also included to prevent significant over-travel beyond the $2\pi$ position.

---

The present invention relates to a step-by-step mechanism for incrementally turning a shaft in response to an applied current pulse.

Mechanical step-by-step mechanisms are known, such as telephone stepping relays or pulse counters which include ratchet mechanisms or the like. The disadvantage of mechanical step-by-step mechanisms is their very short life and the necessity for auxiliary equipment when the mechanical mechanisms are incorporated into electrical systems. Electrical step-by-step mechanisms are also known but in the past have required a rotating magnetic field or a two phase current supply. Such electrical step-by-step motors have the disadvantage of requiring a multi-phase electrical supply which frequently is not present.

A object of this invention is to provide a step-by-step motor which is rugged and has a long life expectancy.

Another object is to provide a step-by-step motor which does not require any mechanical mechanism.

A further object is to provide a step-by-step motor which does not require a multi-phase electrical supply.

The step-by-step motor in accordance with this invention includes a magnetic energy storage system which provides a negative torque through an angle from 0 to $\pi$ during which energy is stored and a positive torque through an angle from $\pi$ to $2\pi$ during which energy is released. Coupled on the same shaft is a drive system which responds to current pulses and rotates the shaft against the negative torque of the storage system through an angle from 0 to $\pi$. After termination of the current pulse the positive torque of the storage system rotates the motor shaft to the $2\pi$ postion. Preferably, a damping system is also coupled to the motor shaft to prevent significant over-travel at the $2\pi$ position.

The foregoing and other objects of this invention will become apparent from theh following specification which sets forth, in detail, one illustrative embodiment of the invention. The drawings form part of this specification wherein:

FIGURE 1 is a cross section of the step-by-step motor in accordance with this invention;
FIGURE 2 is a cross section of the motor drive system taken along lines A—A in FIGURE 1;
FIGURE 3 is a cross section of the energy storage system taken along lines B—B in FIGURE 1;
FIGURE 4 is a cross section of the damping system taken along lines C—C in FIGURE 1; and
FIGURE 5 includes curves of various motor characteristics as a function of the angle of rotation.

The drive motor portion 11 of the step-by-step motor includes a pair of diametrically opposite stator pole pieces 12 which are coupled to opposite ends of a cylindrical exciter winding 14 by means of corresponding jackets 13 to thereby create a magnetic field between the stator poles whenever the winding is energized. The associated rotor 16 includes permanent disc magnets fastened to shaft 17 and magnetized to provide aligned, diamtrically opposite north and south poles N and S respectively. Shaft 17 is journaled between a pair of centrally located, self-lubricating, sealed bearings 19 and 30, bearing 19 being centrally mounted in an end cover 18 adjacent one end of drive motor 11. Stator poles 12 each include pole piece extensions 12a which extend in a circumferential direction to thereby partially surround the rotor.

The energy storage unit 21 of the step-by-step motor is coupled to drive motor 11 by means of a non-magnetic ring 20 and includes a permanent magnet stator 22 which provides a south pole $S_1$ diametrically opposite but axially displaced from an associated north pole $N_1$. The rotor 23 of the energy storage system includes disc magnets mounted on shaft 17 and magnetized to provide a magnetic north pole $N_2$ diametrically opposite and axially displaced from a south pole $S_2$. South pole $S_1$ of the stator is axially aligned with north pole $N_2$ of the rotor, and likewise, north pole $N_1$ of the stator is axially aligned with south pole $S_2$ of the rotor. The system is shown in the rest or preferred position in FIGURE 3 with poles $N_1$ and $S_1$ of the stator adjacent poles $S_2$ and $N_2$, respectively, of the rotor. In FIGURE 1 the shaft is shown rotated 180° such that poles $N_2$ and $S_2$ of the rotor are opposite their associated stator poles $S_1$ and $N_2$. There need be no specific orientation between the magnetic poles of the stator 22 in the energy storage system and the stator poles 12 of the drive motor, provided the magnetic poles of the rotors 16 and 23 are oriented accordingly. To simplify the illustrations, stator poles $N_1$ and $S_1$ are shown in a horizontal plane in FIGURE 3 and in a vertical plane in FIGURE 1.

The portions of pole pieces $N_1$ and $S_1$ which extend close to rotor 23 are relatively narrow to provide a pair of relatively narrow north and south poles extending in the direction of shaft 17. The remainder of the stator is constructed to provide a substantially large air gap between the stator 22 and rotor 23.

A magnetic damping system 25 is coupled to the energy storage system through a non-magnetic ring 24. Stator 26 of the damping system includes a permanent magnet structure providing diametrically opposite north and south poles. A centrally located core 28, which can be soft iron or a permanent magnet, is secured to end cover 29 and completes the flux path between the north and south poles of the stator. A hollow damping cylinder 27 is secured to shaft 17 and fits in the air gap surrounding core 28. Bearing 30 is centrally mounted in one end of core 28.

Screws or similar fastening devices pass through the structure along lines 31–32 and can be used to urge one end plate toward the other to thereby maintain the damping system, energy storage system, and the drive motor in their proper positions.

When a current pulse $I_A$ is applied to exciter winding 14, a torque $M_A$ acts upon rotor 16 to turn shaft 17 through an angle of 180° with an angular velocity $\omega$ as shown in FIGURE 5, these values being plotted as a function of the angle of rotation. The current pulse $I_A$ can be constant or pulsating as shown in FIGURE 5. In all cases, the shaft rotation is approximately 180° in response to energization of the winding since at this point the rotor reaches a stable position with poles N and S of rotor 16 substantially aligned with the magnetic poles created in pole pieces 12 through energization of winding 14.

When current pulse $I_A$ terminates, the drive motor torque $M_A$ disappears and the shaft is then rotated another 180° due to the torque $M_S$ created by energy storage system 21. In other words, the energy storage system rotates the shaft until the stable preferred position is reached where stator poles $S_1$, $N_1$ are adjacent rotor poles $N_2$, $S_2$ respectively. Thus, when winding 14 is energized the shaft first rotates 180° against the negative torque $M_S$ thereby storing energy in storage system 21, and thereafter, the shaft rotates another 180° when the stored energy is released to supply a positive torque.

Rotors 16 and 23 are orientated so that dead center points do not effect the operation of the motor. The rotors are positioned so that upon excitation of winding 14 the inertia of the rotor carries shaft 17 into the positive torque region of the energy storage system. The actual rest position is at an equilibrium point where the positive torque $M_S$ balances the negative holding torque $M_A$ of the drive motor. Accordingly, reliable 360° rotation is achieved in response to each applied current pulse.

Torques $M_A$ and $M_S$ as well as the damping torque produced by the damping cylinder 27 and the friction of the bearings determines the angular velocity $\omega$. This angular velocity is expressed according to the following formula:

$$\omega = a \cdot t \cdot e^{-bt}$$

in which $a$ and $b$ are constants which can be determined, and $t$ is time. The angular position $\varphi$ can be calculated by the formula $\varphi = \int \omega dt$.

The magnitude of current pulse $I_A$ theoretically should not effect the angular speed $\omega$ since the angular speed during the first 180° rotation under the influence of the current pulse should be the same as the speed during the second 180° rotation under the influence of the energy storage system. The surplus torque provided by the current pulse is dissipated in the damping system. However, it is nevertheless desirable to maintain the magnitude of current pulse $I_A$ within predetermined limitation so that the oscillation will not occur at the end of the first 180° rotation due to the inertia of the rotor. To minimize the inertia of the rotor the damping rotor is a hollow cylinder and rotors 16 and 23 are constructed from low specific gravity ceramic permanent magnets. In a typical unit, one to two watts are required to energize the winding and produce torques between 4 and 8 cmg. (centimeter milligrams).

The pole piece extensions 12a are used to minimize the negative torque created by residual magnetism of the drive motor during the rotation from 180° to 360°. When winding 14 is energized to rotate the shaft from 0° to 180°, the pole piece extensions become saturated and therefore most of the magnetic flux is concentrated at the center portions of stator poles 12 which are preferably somewhat tapered to further concentrate the magnetic field. However, during the rotation from 180° to 360°, the residual magnetism is fairly uniformly distributed over the entire pole face surface covering almost half of the rotor surface. Accordingly, the rotor of the drive motor has no preferred position when winding 14 is not energized.

While only a single embodiment has been specifically described in the foregoing specification it should be obvious that there are numerous possible variations within the scope of this invention. For example, a soft iron core could replace permanent magnet rotor 23 and would be constructed having a pair of diametrically opposite projections providing a low magnetic resistance when adjacent stator poles $N_1$ and $S_2$. Also such an iron core could be constructed to achieve a variety of desired characteristics.

The invention is by no means limited to two pole structures since multipole step-by-step motors can be constructed utilizing the same principles. In a two pole unit such as described in the detailed specification there is no difference between the actual degrees of rotation and the electrical degrees of rotation. However, in a four pole unit, for example, $2\pi$ electrical degrees equals 180° of shaft rotation and in an eight pole unit $2\pi$ electrical degrees equals 90° of shaft rotation. Accordingly, it should be understood that the foregoing description refers principally to electrical degrees.

The invention is more particularly set forth in the appended claims.

What is claimed is:
1. A step-by-step motor comprising
 a shaft,
 a drive motor operatively coupled to rotate said shaft approximately through $0-\pi$ electrical degrees in response to an applied current pulse, and
 an energy storage system operatively coupled to said shaft
   to store energy while providing negative torque during said shaft rotation through $0-\pi$ electrical degrees, and
   to provide positive torque for rotating said shaft through $\pi-2\pi$ electrical degrees.

2. A step-by-step motor in accordance with claim 1 wherein said energy storage system has at least one stable position, said drive motor includes magnetic poles and the number of stable positions in said storage system is equal to the number of pairs of poles in said drive motor.

3. A step-bystep motor in accordance with claim 2 wherein said stable position for said energy storage system is displaced by $\pi$ electrical degrees from the shaft position established by energization of said drive motor.

4. A step-by-step motor in accordance with claim 1 wherein the angular velocity $\omega$ of the shaft in response to an applied current pulse is a function of time such that $$\omega = a \cdot t \cdot e^{-bt}$$

wherein $a$ and $b$ are constants,
wherein the angle of rotation $\varphi$ is $$\varphi = \int \omega dt$$

and wherein $\omega = 0$ when $\varphi = \pi$.

5. A step-by-step motor comprising
 a shaft,
 a drive motor operatively coupled to rotate said shaft approximately through $0-\pi$ electrical degrees in response to an applied current pulse,
 an energy storage system operatively coupled to said shaft and including
   a permanent magnet stator, and
   a rotor having a preferred position aligned with the magnetic field created by said stator,
 said energy storage system being constructed to store energy while being rotated through $0-\pi$ electrical degrees from said preferred position and to release previously stored energy for rotating said shaft through $\pi-2\pi$ electrical degrees to the next preferred position.

6. A step-by-step motor in accordance with claim 5 wherein said stator includes at least one pair of axially displaced poles.

7. A step-by-step motor in accordance with claim 6 wherein said rotor includes at least one pair of axially displaced permanent magnet poles disposed so that magnetic poles created by said rotor can be aligned with opposite magnetic poles of said stator when said rotor is at said preferred position.

8. A step-by-step motor in accordance with claim 5 wherein said drive motor is magnetically separated from said energy storage system.

9. A step-by-step motor in accordance with claim 5 wherein said drive motor includes a permanent magnet rotor and electromagnetic stator means, and wherein the preferred shaft position of said energy storage system is slightly displaced from the dead center point between said stator and rotor of said drive motor.

10. A step-by-step motor in accordance with claim 5 wherein the exact rest position of said shaft after rotation through approximately $0-\pi$ electrical degrees is the position where the negative restraining torque created by the drive motor proportional to the applied current pulse magnitude is in equilibrium with the positive torque provided by said energy storage system.

11. A step-by-step motor in accordance with claim 5 wherein said drive motor includes
a permanent magnet structure mounted on said shaft to form a rotor,
pole pieces adjacent said rotor,
pole piece extensions coupled to said pole pieces so that said pole pieces and said pole piece extensions combined substantially surround said roto, and
electromagnetic winding means coupled to said pole pieces to create a magnetic field which saturates said pole piece extension so that said field is largely concentrated at said pole pieces, the residual magnetism after energization of said winding being spread over the combined pole piece and pole piece extension surfaces.

12. A step-by-step motor comprising
a shaft,
a drive motor operatively coupled to rotate said shaft approximately through $0-\pi$ electrical degrees in response to an applied current pulse,
an energy storage system operatively coupled to said shaft and including
a permanent magnet stator, and
a rotor having a preferred position alinged with the magnetic field created by said stator,
said energy storage system being constructed to store energy while being rotated through $0-\pi$ electrical degrees from said preferred position and to release previously stored energy for rotating said shaft through $\pi-2\pi$ electrical degrees to the next preferred position, and
a damping system coupled to said shaft to provide an opposing torque which varies as a function of speed of rotation.

13. A step-by-step motor in accordance with claim 12 wherein said damping system includes a permanent magnet stator and a cylindrical rotor attached to said shaft, said damping system being magnetically separated from said drive motor and energy storage system.

14. A step-by-step motor comprising
a shaft;
a drive motor including
ceramic permanent magnet discs secured to said shaft to form a rotor, and
a stator including an exciter winding for creating a magnetic field for rotating said rotor through $0-\pi$ electrical degrees when said winding is energized; and
an energy storage system operatively coupled to said shaft to provide positive torque through $\pi-2\pi$ electrical degrees including
ceramic permanent magnet discs secured to said shaft to form a rotor providing axially displaced magnetic poles, and
a permanent magnet stator providing magnetic poles so disposed that magnetic poles created by said rotor are aligned with opposite poles created by said stator when said energy storage system is at its preferred position.

15. A step-by-step motor in accordance with claim 14 wherein said ceramic permanent magnets have a high coercive force and a low specific gravity.

References Cited
UNITED STATES PATENTS

| | | | |
|---|---|---|---|
| 2,802,121 | 8/1957 | Sorchy | 310—77 |
| 2,982,872 | 5/1961 | Fredrickson | 310—163 |
| 3,197,659 | 7/1965 | Marshall | 310—49 |
| 3,206,623 | 9/1965 | Snowdon | 310—162 |
| 3,293,460 | 12/1966 | Iwai et al. | 310—49 |

WARREN E. RAY, Primary Examiner

U.S. Cl. X.R.
310—114, 154, 156